(12) United States Patent
Freeman

(10) Patent No.: US 9,278,737 B2
(45) Date of Patent: Mar. 8, 2016

(54) REMOTE CONTROL FISHING ROBOT

(71) Applicant: Caleb Freeman, Faribault, MN (US)

(72) Inventor: Caleb Freeman, Faribault, MN (US)

( * ) Notice: Subject to any disclaimer, the term of this patent is extended or adjusted under 35 U.S.C. 154(b) by 213 days.

(21) Appl. No.: 14/043,287

(22) Filed: Oct. 1, 2013

(65) Prior Publication Data

US 2014/0090288 A1  Apr. 3, 2014

Related U.S. Application Data

(60) Provisional application No. 61/708,238, filed on Oct. 1, 2012.

(51) Int. Cl.
| | |
|---|---|
| *A01K 97/00* | (2006.01) |
| *B63B 35/14* | (2006.01) |
| *A01K 93/00* | (2006.01) |
| *A01K 91/02* | (2006.01) |
| *B63H 11/12* | (2006.01) |
| *B63B 35/00* | (2006.01) |

(52) U.S. Cl.
CPC ............ *B63B 35/14* (2013.01); *A01K 91/02* (2013.01); *A01K 93/00* (2013.01); *A01K 97/00* (2013.01); *B63B 2035/008* (2013.01); *B63H 11/12* (2013.01)

(58) Field of Classification Search
CPC ............................. A01K 97/00; A01K 93/00
USPC .................... 43/26.1, 4, 54.1, 43.11
See application file for complete search history.

(56) References Cited

U.S. PATENT DOCUMENTS

| 1,850,296 | A | * | 3/1932 | Vermeulen | .................. 43/26.1 |
| 2,734,300 | A | * | 2/1956 | Mandel | ............... A01K 91/18 |
| | | | | | 43/26.1 |
| 3,574,966 | A | * | 4/1971 | Sullivan | ............. A01K 74/00 |
| | | | | | 43/13 |
| 3,710,500 | A | * | 1/1973 | Pena | .................. A01K 91/02 |
| | | | | | 43/17.5 |
| 3,793,761 | A | * | 2/1974 | Bonham | .................. 43/26.1 |
| 3,878,634 | A | * | 4/1975 | Quimpo | ............. A01K 93/02 |
| | | | | | 43/15 |
| 4,161,077 | A | * | 7/1979 | Ciaccio et al. | ............. 43/26.1 |
| 4,339,888 | A | * | 7/1982 | Sheng-Jung | ........... A01K 91/02 |
| | | | | | 43/26.1 |
| 4,569,146 | A | * | 2/1986 | Lowrance | ............ A01K 97/02 |
| | | | | | 43/17.1 |
| 4,638,585 | A | * | 1/1987 | Korte | .................. A01K 91/02 |
| | | | | | 43/26.1 |
| 4,757,633 | A | * | 7/1988 | Van Cleve | .................. 43/26.1 |
| 4,825,580 | A | * | 5/1989 | Gray | .................. A01K 91/10 |
| | | | | | 43/43.1 |
| 4,839,675 | A | * | 6/1989 | Owen | .............................. 43/4 |

(Continued)

*Primary Examiner* — Darren W Ark
(74) *Attorney, Agent, or Firm* — Robert Gray; The Gray Law Group, Ltd.

(57) ABSTRACT

A low-clearance remote control fishing robot is disclosed. A domed device casing is mounted between a pair of floats. The top of the device is fitted with a lightweight probe mounted on a spring. Each float has installed within its rear end a pivotal air jet. The air jets are powered by an onboard compressor. Beneath the device casing is a reel of fishing line. An electric motor drives the reel. Sensors are provided to gauge line length and depth and line tension. Onboard depth-finding and fish-finding sonar are provided, as well as other sensing systems, and an above-surface or below surface camera. Two way data communication occurs wirelessly with a remote control unit. A water-impervious carry case is provided to store the device and remote control. A positioning apparatus may be installed for fishing from a fixed position against a boat, pier, or ice hole.

11 Claims, 4 Drawing Sheets

(56) References Cited

U.S. PATENT DOCUMENTS

| | | | |
|---|---|---|---|
| 4,899,480 A * | 2/1990 | Park | 43/4 |
| 5,016,385 A * | 5/1991 | Blease | 43/26.1 |
| 5,086,581 A * | 2/1992 | Barra et al. | 43/26.1 |
| 5,154,016 A * | 10/1992 | Fedora et al. | 43/26.1 |
| 5,165,193 A * | 11/1992 | Dankwardt | A01K 91/02 43/26.1 |
| 5,168,651 A * | 12/1992 | Wilson | A01K 93/02 43/15 |
| 5,201,884 A * | 4/1993 | Nicholas | 43/26.1 |
| 5,293,712 A * | 3/1994 | Lo | 43/26.1 |
| 5,309,664 A * | 5/1994 | Wright | 43/26.1 |
| 5,361,530 A * | 11/1994 | Kashani et al. | 43/26.1 |
| 5,363,587 A * | 11/1994 | Nordling | 43/26.1 |
| 5,483,767 A * | 1/1996 | Langer | 43/4 |
| 5,511,335 A * | 4/1996 | Langer | 43/4 |
| 5,581,932 A * | 12/1996 | Bell | 43/26.1 |
| 5,782,033 A * | 7/1998 | Park et al. | 43/4 |
| 6,041,537 A * | 3/2000 | Sullivan | 43/26.1 |
| 6,389,732 B1 * | 5/2002 | Daniel | 43/26.1 |
| 6,520,105 B2 * | 2/2003 | Koda et al. | 43/26.1 |
| 6,760,995 B2 * | 7/2004 | Mueller | 43/4 |
| 7,398,741 B2 * | 7/2008 | Koda et al. | 114/144 RE |
| 7,854,087 B1 * | 12/2010 | Pervez | 43/26.1 |
| 8,154,953 B1 * | 4/2012 | Sims et al. | 43/26.1 |
| 8,181,380 B2 * | 5/2012 | Lankinen | 43/17.1 |
| 8,756,853 B2 * | 6/2014 | Davidson | 43/4 |
| 8,919,034 B2 * | 12/2014 | Alhuwaishel | 43/17 |
| 2005/0102883 A1 * | 5/2005 | Temes | 43/26.1 |
| 2006/0059766 A1 * | 3/2006 | Huikari | 43/26.1 |
| 2011/0308136 A1 * | 12/2011 | Dragony | A01K 93/00 43/43.11 |

* cited by examiner

REMOTE CONTROL FISHING ROBOT

CROSS-REFERENCE TO RELATED APPLICATIONS

Not Applicable

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to remote control machines and robots and in particular to floating remote control devices for use in fishing. Fishing is generally conducted from a shore, pier, or boat. Different vantage points offer different tradeoffs in terms of convenience, access to different fishing areas, versatility and cost, however some locations where fish may gather are difficult to reach by any of the traditional means. For example, shallow water with thick vegetation or low-hanging branches may be impassable to a boat, even to a small fishing boat. If such locations are far from dry ground and not developed with a pier, they may also be inaccessible to a fisherman on foot. Even when one does reach an out-of-the way area, some fishing tools commonly used with a boat, such as depth and fish-finding sonar systems, may be unavailable. To provide access and convenience to all areas of a body of water, what is needed is a remote control device that can float on the water and travel anywhere requiring only minimal clearance while also providing all of the modern tools and equipment that may be commonly found and installed on a sport fishing boat.

SUMMARY OF THE INVENTION

Accordingly, the invention is directed to a low-clearance remote control fishing robot. A domed device casing is provided and mounted between a pair of elongated floats. The top of the device is fitted with a lightweight probe mounted on a spring. Each float has installed within its rear end a pivotal air jet. The air jets are powered by compressed air from an onboard compressor. Beneath the device casing is a reel of fishing line terminating in a hook, sinker, and stopper. An electric motor drives the reel. Sensors are provided to gauge line length and depth and line tension. Onboard depth-finding and fish-finding sonar are provided, as well as other sensing systems, such as a camera Two way data communication occurs wirelessly with a remote control unit. A water-impervious carry case is provided to store the device and remote control. A positioning apparatus may be installed for fishing from a fixed position against a boat, pier, or ice hole.

It is an object of the invention to provide a remote control fishing device.

It is an object of the invention to provide a remote control fishing device that can access low-clearance areas beneath branches, vegetation, and piers.

It is an object of the invention to provide a remote control fishing device that provides intelligent fishing with fish-finding and depth finding sonar.

It is an object of the invention to provide a remote control fishing device that can autonomously set the hook and reel in a fish.

It is an object of the invention to provide a remote control fishing device that can be placed in a fixed position, for example off of the side of a boat or pier, or in an ice hole.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF THE INVENTION

Figure 1:
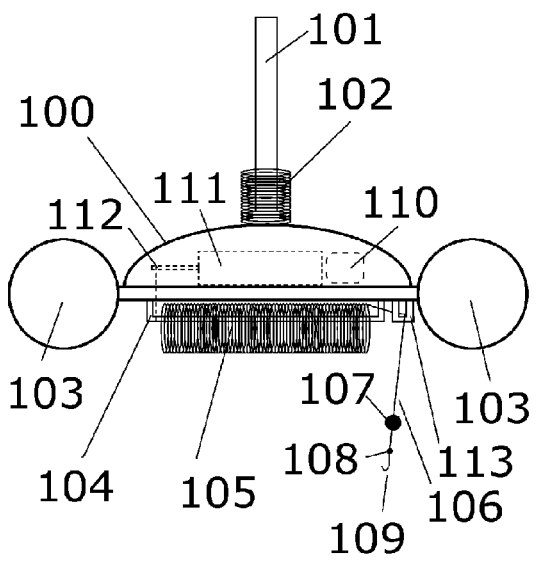
FIG. 1 shows a front view of the first exemplary embodiment, displaying the device casing 100, probe 101, spring 102, floats 103, spool axle 104, spool 105, line 106, stopper 107, weight 108, hook 109, electronics housing 110, motor 111, reel drive mechanism 112, and line guide 113.
Figure 2:
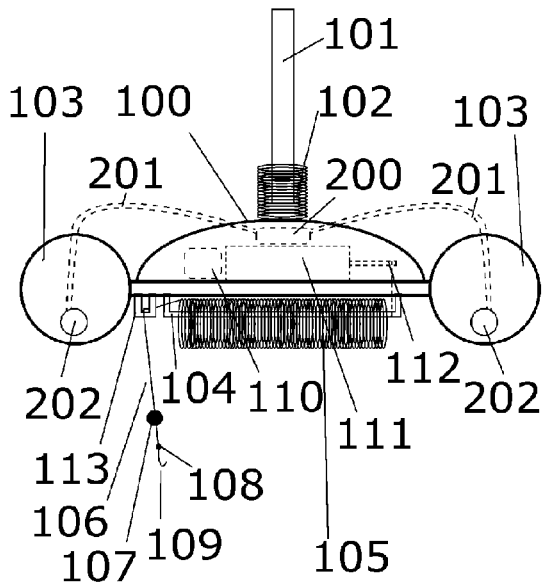
FIG. 2 shows a rear view of the first exemplary embodiment, displaying the device casing 100, probe 101, spring 102, floats 103, spool axle 104, spool 105, line 106, stopper 107, weight 108, hook 109, electronics housing 110, motor 111, reel drive mechanism 112, line guide 113, compressor 200, fluid lines 201, and jets 202.
Figure 3:
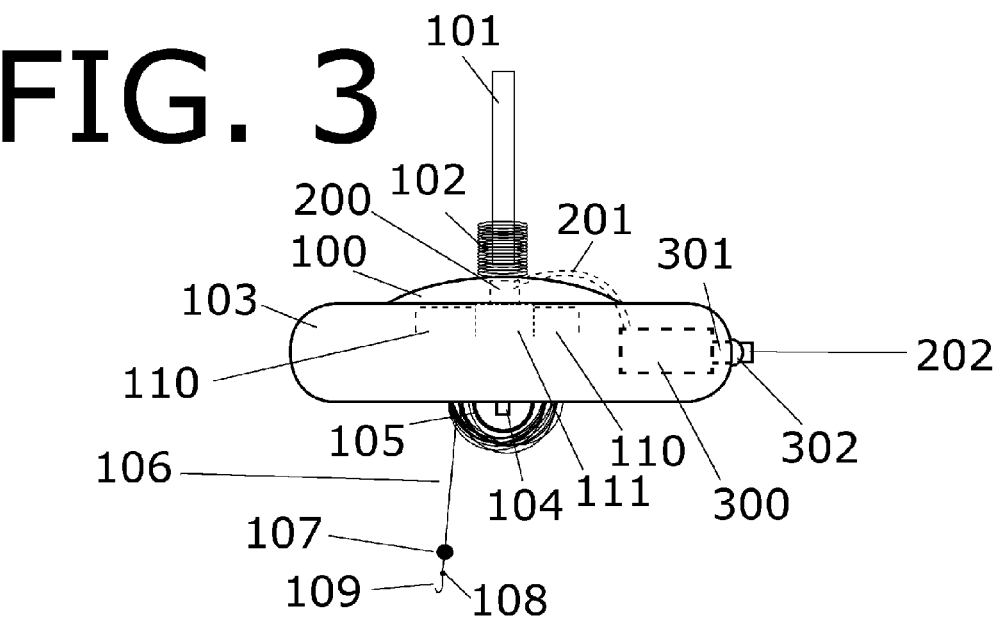
FIG. 3 shows a left side profile view of the first exemplary embodiment, displaying the device casing 100, probe 101, spring 102, floats 103, spool axle 104, spool 105, line 106, stopper 107, weight 108, hook 109, electronics housing 110, motor 111, compressor 200, fluid lines 201, jets 202, pressure chamber 300 release valve 301, and servo 302.

Referring now to the invention in more detail, the invention is directed to a remote control fishing robot having the aforementioned advantages. FIGS. 1-3 show the first exemplary embodiment. A device casing 100 is provided. The device casing 100 preferably has a flat bottom and a dome-top. The device casing 100 is made of a lightweight and durable material, such as plastic or aluminum. The device casing 100 is preferably watertight and water impervious to keep the internally mounted devices dry. Fixed to the top center of the device casing 100 is the first end of a spring 102. The second end of the spring 102 is fixed to a probe 101, which is mounted such that its neutral position is about vertical. The probe is a filled or hollow cylindrical shape of a lightweight, durable material, such as plastic or aluminum. The spring constant of the spring 102 is such that the probe may easily be bent over 90° or more when the device comes into contact with a low-clearance obstacle and spring back to vertical after clearing the obstacle. The probe 101 may be long, for example 18" or longer. The probe allows an easy handhold for a user to set the device in the water or retrieve the device from the water, even over a railing as may be found on a boat, pier, or shore structure.

Referring still to the first exemplary embodiment of FIGS. 1-3, the device casing 100 is fixedly mounted between a pair of floats 103 or pontoons. The floats 103 may be made, preferably, of a non-inflated lightweight foam material, though other buoyant materials and inflatables may also be used. The floats 103 are generally elongated and cylindrical, but may terminate at their ends in other shapes, preferably rounded, pointed, or otherwise fluid dynamic shapes. Alternatively shaped floats 103 and varying numbers of floats 103 are also contemplated; the floats 103 may generally be of any shape or number and in any configuration. The floats 103 should generally be of a size and buoyancy suitable for supporting the weight of a large specimen of a particular fish species for which a particular embodiment of the invention is intended. Beneath the device casing and transverse to the floats 103 is fixedly mounted a spool axle 104. The spool axle is a rigid rod suspended rotatably between a pair of rigid vertical supports. Rotating on spool axle 104 is a spool 105, which holds a coiled line 106. The spool 105 is a rigid drum, preferably with expanded end caps and a central connection point to which the first end of the line 106 may be tied. The line 106 may be a line of any gauge or material, though standard nylon fishing line is preferred. The second, unspooled end of the line is threaded through a line guide 113, which is a loop of rigid material that allows the line to hang cleanly from the bottom of the device. The second end of the line is tied to a hook 109. Tied above the hook 109 is a stopper 107 and a weight 108. The hook 109 and weight 108 are exemplary components of a fishing tackle configurations; the present invention generally may employ any fishing tackle configuration of hooks, weights, floats, lures, and bait, including live bait, dead bait, vegetable-based bait, and synthetic bait. The stopper 107 prevents the second end of the line from being drawn up through the line guide 113. The stopper 107 should be large enough to stop the line in the line guide but should not add undue buoyancy or weight to the line. A weight 108 is provided to sink the line as it is extended, and the hook 109 is provided to attach bait and hook fish.

Referring still to the first exemplary embodiment of FIGS. 1-3, mounted internally within the device casing 100 are one or more electronics housings 110, which contain a battery (or other power source) and devices discussed further below. Also mounted internally is a motor 111, which turns a reel drive mechanism 112. The reel drive mechanism 112 and motor 111 should be provided with suitable durability and torque for supporting the weight of a large specimen of a particular fish species for which a particular embodiment of the invention is intended. The reel drive mechanism 112 connects to the spool axle 104 by any mechanical linkage of the many known in the prior art and transfers mechanical energy from the outside of the device casing 100 to the inside in such a way as to not interfere with the watertight property of the device casing 100. The motor 111 and reel drive mechanism 112 should be reversible and speed variable for maximum versatility while working with or without a load (e.g. a caught fish).

Referring still to the first exemplary embodiment of FIGS. 1-3, also mounted internally within the device casing 100 is an air compressor 200. The compressor provides air or other fluid under pressure to a pair of fluid lines 201. The fluid lines 201 are made of flexible airtight tubing. Each of the fluid lines 201 extends from an air output of the compressor 200 at its first end, out of the device casing 100 (via a sealed exit point so as not to interfere with the watertight property of the device casing 100), into the inside of one of the floats 103 to pressurize a pressure chamber 300. The pressure chamber 300 is in fluid communication with a variable release valve 301, which is in fluid communication with a pivotal jet 202. The jet 202 may be pivoted in the horizontal plane, preferably at least 90° centered about the straight rearward direction. The pivotal motion of the jets 202 is controlled by a servo 302. The aforementioned parts form the drive system for the device, however in alternative embodiments different drive systems may be used. For example, a rear-facing above-water fan or in-water screw or water jet may be used, and may each be either directly pivoted or fixed rearward and used in combination with a rudder. Such alternative propulsion systems, however, are generally undesirable as they tend to cause a wake and/or unnecessary noise, both of which tend to scare fish away.

Figure 4:
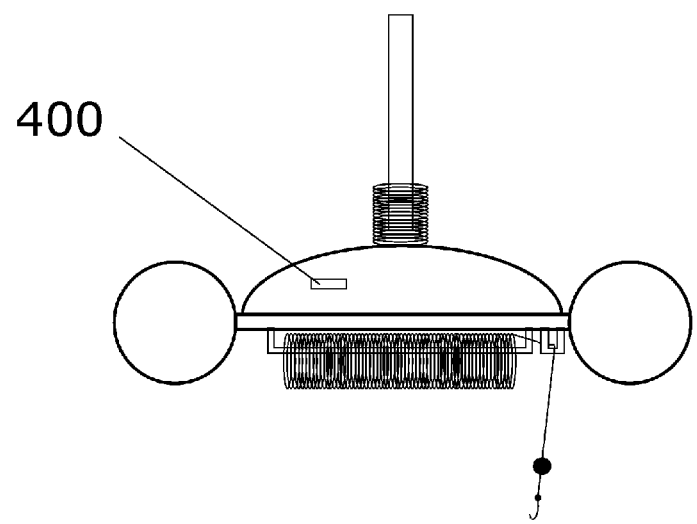
FIG. 4 shows a front view of the second exemplary embodiment with an installation point for a positioning apparatus, displaying the installation point 400.
Figure 5:
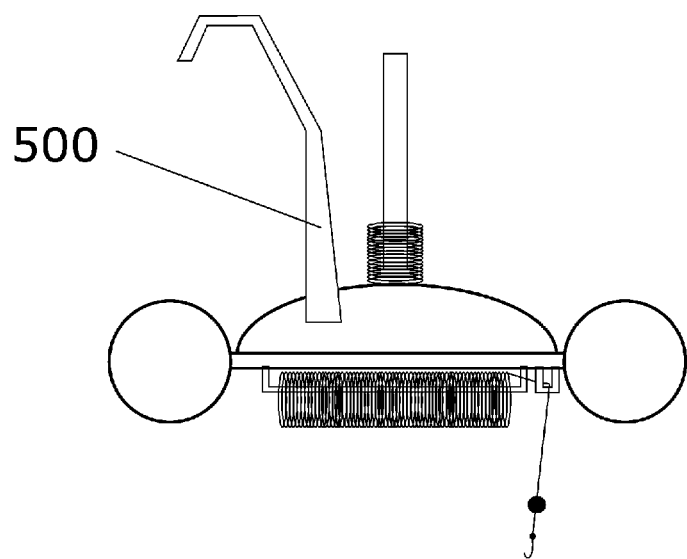
FIG. 5 shows a front view of the second exemplary embodiment with a positioning apparatus installed, displaying the positioning apparatus 500.

Referring now to the second exemplary embodiment of FIGS. 4-5, an optional mode of the invention is to fix the device to a single location and use the line control and sonar functions without the drive function. Embodiments supporting this configuration, including the second exemplary embodiment feature an installation point 400 for a positioning apparatus 500. The positioning apparatus 500 may be a rigid or semi-rigid hook or part, or other shape suitable for fix the device to a waterside structure, such as a boat rail, a pier, or even the edge of an ice hole in ice fishing. Different types and sizes of positioning apparatus 500 may be provided for different applications, with all engaging to the installation point 400, for example with releasable snap-together components, or similar fasteners (such fasteners being well-known in the prior art).

Figure 6:
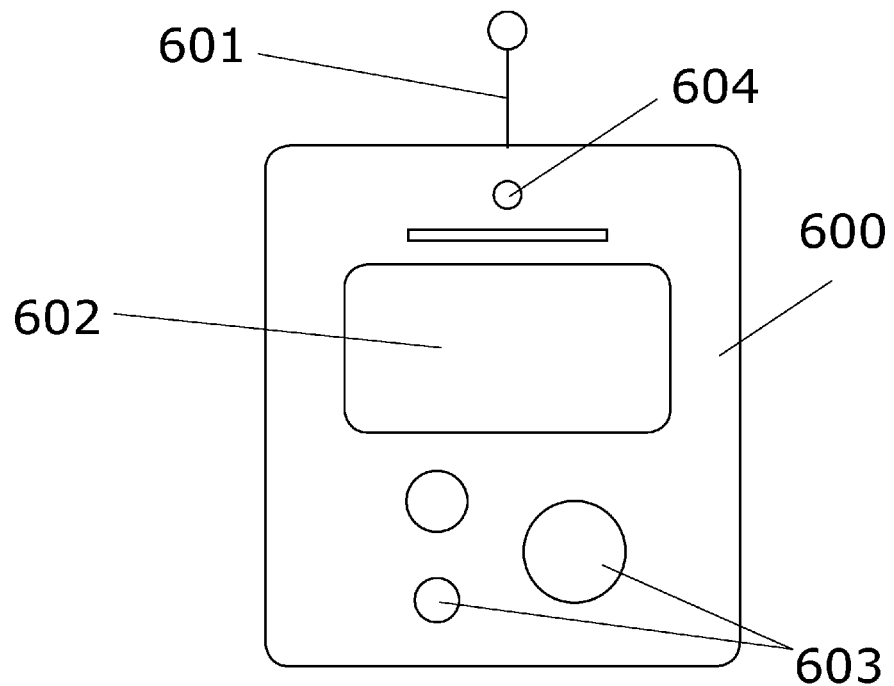
FIG. 6 shows an exemplary embodiment of a remote control portion of the invention, displaying the remote control device casing 600, antenna 601, screen 602, controls 603, and speaker 604.

FIG. 6 shows an example remote control. In an example remote control for use with any embodiment of the invention, a remote control device casing 600 is provided. Electronic components, discussed in more detail below, are mounted within the device casing 600. Externally visible are an antenna 601, screen 602, controls (e.g. buttons, joysticks, dials, and the like) 603, and a speaker 604. All such control components are well-known in the prior art.

Figure 7:
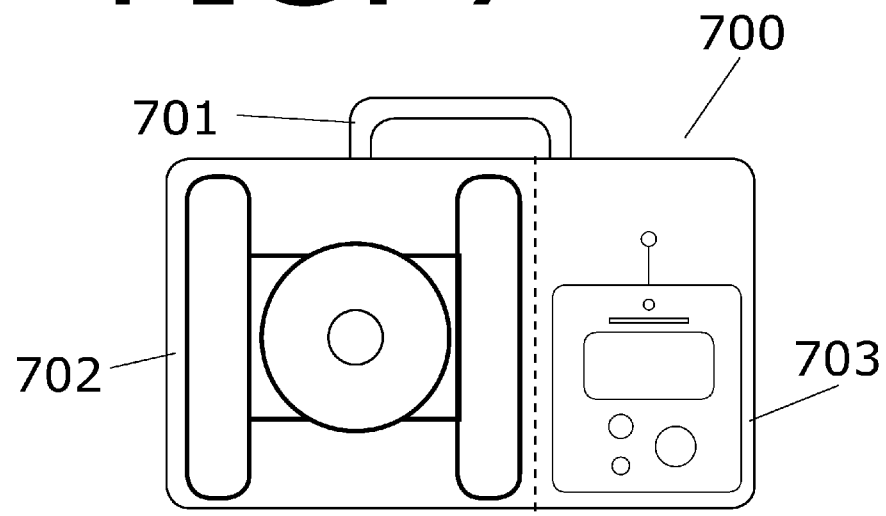
FIG. 7 shows an exemplary embodiment of a carrying case portion of the invention, displaying the carry case 700, handle 701, first compartment 702, and second compartment 703.

FIG. 7 shows an example carry case for the invention. The invention is preferably provided with a water-impervious carry case 700 to store the device and controller, and optionally also fishing tackle and other equipment. The probe 101 may be bent over or removed for storage. In general the carry case 700 features at least a handle 701, a first compartment 702 for the device, and a second compartment 703 for the remote control. Additional compartments may provide formed space for the removed probe 101, removed positioning apparatus 500, or fishing tackle.

Figure 8:
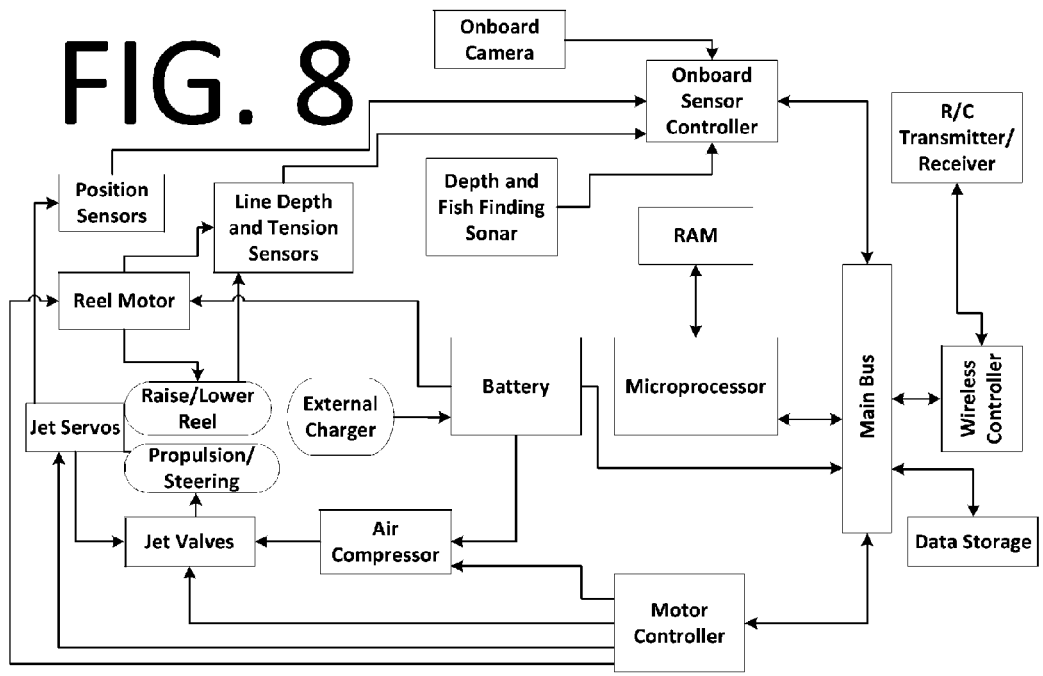
FIG. 8 is a component diagram showing the electronic and electromechanical components of the first exemplary embodiment.

FIG. 8 shows an exemplary configuration the internal electronic and electromechanical components of the device. In the drawing, the components are shown as logically connected to and in direct or indirect electronic, mechanical, or fluid communication with each other; the lines do not literally represent intended electronic or other pathways. The components shown are all well-known in the prior art. Within or separate from the electronics housing or housings 110, a battery is provided. The battery may be charged by an external charger, either by AC from standard wall current or by DC, for example from a car or boat electrical system. Alternatively, replaceable batteries may be used. A computer subsystem is provided which includes a microprocessor, RAM, persistent data storage, motor controller, wireless controller, and onboard sensor controller all connected by a main bus. The data storage stores and loads a software program, described in further detail below, to be executed by the microprocessor. The wireless controller is in two way communication with a remote control transmitter and receiver through which two-way data communication with the remote control is possible. The motor controller provides control signals to the air compressor to start, stop and control speed, which provides pressurized air to the jet valves and associated pneumatic systems. The motor controller also provides control signals to the jet valves (independently) to close or be opened to a specified degree. The motor controller also sends control signals to the jet servos to pivot the air jets (independently) to a specified degree. The motor also sends control signals to the reel motor to raise and lower the line or apply torque in a specified direction. Tied to each of the servos is a position sensor (optionally included in the servo's control signal). Tied to the reel motor is are sensors to measure the length of line reeled out, angle of line (thus making depth calculation possible) and tension on the line (leading to an inference of a fish or obstruction caught). Depth-finding and fish-finding sonar are also provided, as may be one or more digital cameras. The servo sensors, line depth and tension sensors, sonar systems, and cameras all send input via an onboard sensor controller (logically, a single onboard sensor controller, though optionally a plurality of controllers, as needed for the particular sensors and electronics hardware used), making the sensor data available to the computer subsystem.

Figure 9:
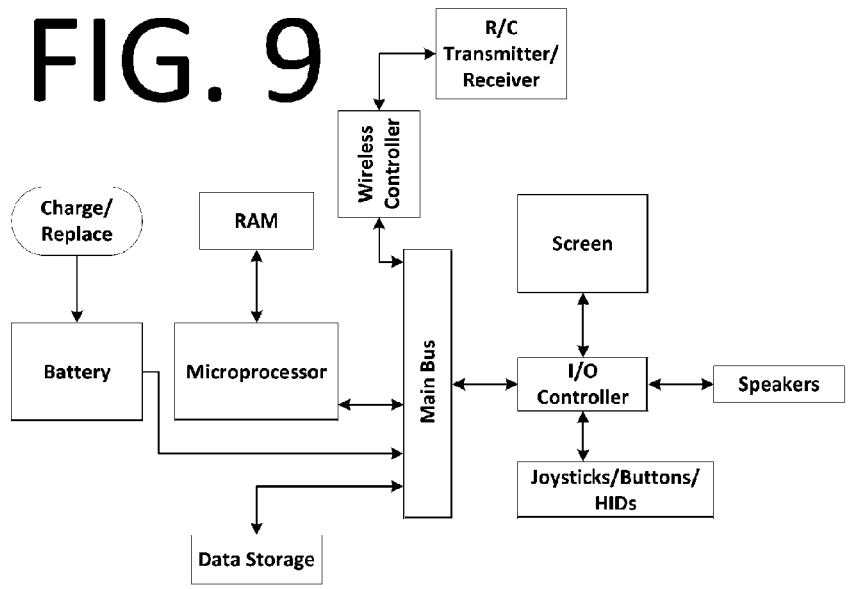
FIG. 9 is a diagram showing the electronic and electromechanical portions of an exemplary remote control portion of the invention.

FIG. 9 shows an exemplary configuration the internal electronic and electromechanical components of the remote control. In the drawing, the components are shown as logically connected to and in direct or indirect electronic, communication with each other; the lines do not literally represent intended electronic pathways. The components shown are all well-known in the prior art. Within the electronics, a battery is provided. The battery may be replaceable or may be rechargeable in place from AC wall power or from a DC vehicle electrical system. A computer subsystem is provided which includes a microprocessor, RAM, persistent data storage, wireless controller, and I/O controller all connected by a main bus. The data storage stores and loads a software program, described in further detail below, to be executed by the microprocessor. The wireless controller is in two way communication with a remote control transmitter and receiver through which two-way data communication with the device of the invention is possible. The I/O controller is connected to a plurality of input and output devices, including a screen, speakers, and any joysticks, buttons, dials, force feedback systems, and other human interface devices that may be provided on the remote control.

Stored persistently on the device's onboard data storage and executed by the device's onboard microprocessor is a first software program. Stored persistently on the remote control's onboard data storage and executed by the remote control's onboard microprocessor is a second software program. The first and second software programs function together, communicating wirelessly the remote control transmitters and receivers included on both devices to accomplish the following tasks: (i) engaging and disengaging the device's onboard compressor to achieve propulsion energy; (ii) selectively opening and closing the device's jet valves to achieve propulsion with throttle control; (iii) selectively pivoting the jet servos and/or selectively differing the throttle of each jet to achieve steering; (iv) transmitting user inputs concerning desired steering and throttle from the remote control to the device and converting those inputs to jet servo and valve positions (optionally in the reverse order); (v) unreeling the line to a specified line length; (vi) reading the line angle and calculating line depth based on the line angle and unreeled line length; (vii) accepting a user-specified line length and/or depth and/or angle, transmitting that information from the remote control to the device, and unreeling the line to the desires length/angle/depth; (viii) determining water depth based on the onboard depth-sensing sonar; (ix) detecting the presence of a fish or obstacle on the line; (x) determining or making a heuristic guess at the difference between a fish on the line and an obstacle on the line; (xi) communicating the presence of a fish or obstacle on the line to the user via the remote control screen; (xii) accepting and transmitting a user command to set the hook; (xiii) setting the hook; (xiv) transmitting real time line tension information to the remote control for presentation to the user; (xv) receiving real time reel controls from the remote control for attempting to reel in a fish; (xvi) transmitting fish-finding sonar readings to the remote control from presentation to the user; and (xvii) transmitting digital camera data to the remote control for presentation to the user.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A remotely operated fishing device comprising:
(a) a device casing having a top;
(b) a plurality of floats;
(c) said device casing being affixed to said plurality of floats;
(d) a propulsion and steering means for propelling and steering said remotely operated fishing device;
(e) said propulsion and steering means for propelling and steering said remotely operated fishing device being affixed to one of the group of said device casing, said plurality of floats, or both of said device casing in part and said plurality of floats in part;
(f) a fishing line having a spooled end and a non-spooled end;
(g) a spool;
(h) said fishing line being coiled on said spool such that said spooled end is affixed to said spool;
(i) a spool axle;
(j) said spool being rotatably mounted about said spool axle;
(k) said spool axle being affixed to said device casing;
(l) a line guide;

(m) said non-spooled end of said fishing line being threaded through said line guide;
(n) a tackle configuration;
(o) said tackle configuration being affixed to said unspooled end of said fishing line;
(p) a motor;
(q) a reel drive mechanism;
(r) said motor and said reel drive mechanism being affixed within or to said device casing such that said motor may drive the rotation of said spool via said reel drive mechanism;
(s) at least one electronics housing;
(t) said at least one electronics housing being affixed to said device casing;
(u) a battery;
(v) said battery being mounted within said at least one electronics housing;
(w) a plurality of electronic sensors comprising at least one of the group of an onboard camera, line depth sensor, line tension sensor, depth finding sonar, and fish finding sonar;
(x) an onboard sensor controller;
(y) said plurality of electronic sensors being in electronic communication with said onboard sensor controller;
(z) said onboard sensor controller being mounted within said at least one electronics housing;
(aa) a microprocessor, a computer memory, and a data storage device;
(bb) said microprocessor, said computer memory, and said data storage device being in direct or indirect electronic communication with one another and mounted within said at least one electronics housing;
(cc) a wireless transmitter and receiver;
(dd) a wireless controller;
(ee) said wireless controller being in electronic communication with said wireless transmitter and receiver being mounted within said at least one electronics housing, and said wireless controller being in direct or indirect electronic communication with said microprocessor;
(ff) a motor controller;
(gg) said motor controller being mounted within said at least one electronics housing and in direct or indirect electronic communication with said microprocessor, said motor, and said propulsion and steering means for propelling and steering said remotely operated fishing device;
(hh) said motor, said propulsion and steering means for propelling and steering said remotely operated fishing device, said plurality of electronic sensors, said microprocessor, said computer memory, said data storage device, said wireless transmitter and receiver, said wireless controller, and said motor controller being directly or indirectly powered by said battery;
(ii) a remote control device casing having an exterior;
(jj) a remote control microprocessor, a remote control computer memory, a remote control data storage device, a remote control wireless controller, and a remote control i/o controller;
(kk) said remote control microprocessor, said remote control computer memory, said remote control data storage device, said remote control wireless controller, and said remote control i/o controller being in direct or indirect electronic communication with one another and mounted within said remote control device casing;
(ll) a remote control wireless transmitter and receiver;
(mm) said remote control wireless transmitter and receiver being mounted on or within said remote control device casing and being in wireless electronic communication with said wireless transmitter and receiver and in direct or indirect electronic communication with said remote control wireless controller;
(nn) a plurality of remote control input and output devices comprising at least one of the group of screens, speakers, joysticks, buttons, and human interface devices;
(oo) said plurality of remote control input and output devices being mounted to the exterior of said remote control device casing and being in electronic communication with said remote control i/o controller;
(pp) a remote control battery;
(qq) said remote control battery being mounted within said remote control device casing;
(rr) said remote control microprocessor, said remote control computer memory, said remote control data storage device, said remote control wireless controller, said remote control i/o controller, said remote control wireless controller, said remote control wireless transmitter and receiver, and said plurality of remote control input and output devices being directly or indirectly powered by said remote control battery;
(ss) a first software program;
(tt) said first software program being stored on said data storage device and executed by said microprocessor;
(uu) a second software program;
(vv) said second software program being stored on said remote control data storage device and executed by said remote control microprocessor;
(ww) said first software program having the abilities to conduct two-way wireless communication with said second software program via said wireless transmitter and receiver, to control said propulsion and steering means for propelling and steering said remotely operated fishing device via said motor controller, to control said motor via said motor controller, and to receive input from said plurality of electronic sensors via said sensor controller; and
(xx) said second software program having the abilities to conduct two-way wireless communication with said first software program via said remote control wireless transmitter and receiver, to accept human input via said plurality of remote control input and output devices, and to display human-comprehensible signals via said plurality of remote control input and output devices;

whereby a user may engage in fishing by remotely operating said remotely operated fishing device.

2. The remotely operated fishing device of claim 1 wherein said propulsion and steering means for propelling and steering said remotely operated fishing device comprises:
(a) a compressor;
(b) said compressor being mounted within said device casing and powered by said battery;
(d) a plurality of jets;
(e) a plurality of fluid lines;
(f) each of said jets being mounted rearwardly to one of said floats;
(g) each of said jets being in fluid communication with a pressure chamber, via a jet valve;
(h) said pressure chamber being in fluid communication with one or more of said fluid lines;
(i) each of said jet valves being in direct or indirect electronic communication with said motor controller; and
(j) said first software program further comprising the ability to control the operation of each of said jet valves and of said compressor via said motor controller.

3. The remotely operated fishing device of claim 2 wherein each of said jets is mounted on a servo such that each of said jets may be pivoted in a horizontal plane, each of said servos being in direct or indirect electronic communication with said motor controller, and said first software program further comprising the ability to control each of said servos via said motor controller.

4. The remotely operated fishing device of claim 2 further comprising a spring having a first end and a second end, the first end of said spring being affixed to the top of said device casing, and the second end of said spring being affixed to a probe.

5. The remotely operated fishing device of claim 3 further comprising a spring having a first end and a second end, the first end of said spring being affixed to the top of said device casing, and the second end of said spring being affixed to a probe.

6. The remotely operated fishing device of claim 3 said first and second software programs work in tandem to provide the ability to link input from said plurality of remote control input and output devices with coordinated output to said jet servos and said jet valves.

7. The remotely operated fishing device of claim 1 further comprising a spring having a first end and a second end, the first end of said spring being affixed to the top of said device casing, and the second end of said spring being affixed to a probe.

8. The remotely operated fishing device of claim 1 wherein said plurality of electronic sensors further comprises a fish finding sonar and a line tension sensor, and wherein said first and second software programs work in tandem to provide at least one ability from the group of
  (a) locating a fish in the underwater environment beneath said remotely operated fishing device via said fish finding sonar and displaying a human-comprehensible alert via said plurality of remote control input and output devices;
  (b) identifying a bite on said fishing line via said line tension sensor and displaying a human-comprehensible alert via said plurality of remote control input and output devices; and
  (c) identifying a bite on said fishing line via said line tension sensor and autonomously reeling in the biting fish via control of said motor.

9. The remotely operated fishing device of claim 1 wherein said plurality of remote control input and output devices further comprises a screen, wherein said plurality of electronic sensors further comprises at least one onboard camera, and wherein said first and second software programs work in tandem to provide the ability to display on said screen real time camera data from said at least one onboard camera.

10. The remotely operated fishing device of claim 1 further comprising a positioning apparatus, said positioning apparatus being removably mountable to a complementarily shaped attachment point, said complementarily shaped attachment point being a feature of said device casing.

11. A carrying case in combination with the remotely operated fishing device of claim 1, wherein said carrying case comprises a handle affixed to a combination of a first compartment and a second compartment.

* * * * *